United States Patent
Libin

(10) Patent No.: US 11,282,383 B1
(45) Date of Patent: Mar. 22, 2022

(54) DEPLOYING AN EMERGENCY VEHICLE

(71) Applicant: All Turtles Corporation, Little Rock, AR (US)

(72) Inventor: Phil Libin, San Francisco, CA (US)

(73) Assignee: All Turtles Corporation, Little Rock, AR (US)

(*) Notice: Subject to any disclaimer, the term of this patent is extended or adjusted under 35 U.S.C. 154(b) by 0 days.

(21) Appl. No.: 17/130,237

(22) Filed: Dec. 22, 2020

Related U.S. Application Data

(62) Division of application No. 16/546,389, filed on Aug. 21, 2019, now Pat. No. 10,909,847.

(60) Provisional application No. 62/733,477, filed on Sep. 19, 2018.

(51) Int. Cl.
| | |
|---|---|
| *G08G 1/00* | (2006.01) |
| *G08G 1/0965* | (2006.01) |
| *G10L 25/51* | (2013.01) |
| *G06N 20/00* | (2019.01) |
| *G01C 21/26* | (2006.01) |

(52) U.S. Cl.
CPC ........... *G08G 1/0965* (2013.01); *G06N 20/00* (2019.01); *G10L 25/51* (2013.01); *G01C 21/26* (2013.01)

(58) Field of Classification Search
CPC ...... G08G 1/0965; G06N 20/00; G10L 25/51; G01C 21/26
USPC ........................................................ 340/902
See application file for complete search history.

(56) References Cited

U.S. PATENT DOCUMENTS

| | | | | |
|---|---|---|---|---|
| 7,095,861 | B2* | 8/2006 | Byers | G08B 3/10 |
| | | | | 340/436 |
| 7,106,180 | B1* | 9/2006 | Pompei | A01M 29/18 |
| | | | | 340/384.7 |
| 8,918,343 | B2* | 12/2014 | Mitchell | G10L 17/26 |
| | | | | 706/12 |
| 9,352,817 | B2* | 5/2016 | Simon | G10K 11/26 |
| 9,961,435 | B1* | 5/2018 | Goyal | G10L 25/84 |
| 10,034,083 | B2* | 7/2018 | Bostick | H04W 4/38 |
| 2003/0161483 | A1* | 8/2003 | Byers | G10K 11/346 |
| | | | | 381/61 |
| 2008/0036595 | A1* | 2/2008 | Hollstien | G08B 13/1436 |
| | | | | 340/541 |
| 2010/0088093 | A1* | 4/2010 | Lee | G10L 15/22 |
| | | | | 704/233 |

(Continued)

*Primary Examiner* — Zhen Y Wu
(74) *Attorney, Agent, or Firm* — Muirhead and Saturnelli, LLC

(57) ABSTRACT

Constructing a noise pollution map for an area includes a first subset of users performing initial noise recordings in the area using audio devices, using machine learning to provide classification of noises in the initial noise recordings, a second subset of users, larger than the first subset of users, capturing noise in the area using audio devices, creating summaries of noises using the classification to classify noises captured by the second subset of users, and aggregating the summaries to construct the noise pollution map of the area. The audio devices may include headsets, smart speakers, smart television sets, and/or computers. The summaries of noises may be created using software that is installed locally on devices of the second subset of users. The summaries may include source information, amplitude and frequency characteristics, duration, parameters of a corresponding one of the audio devices, user location, surroundings, and/or user movement information.

13 Claims, 5 Drawing Sheets

(56) References Cited

U.S. PATENT DOCUMENTS

| | | | |
|---|---|---|---|
| 2012/0121113 A1* | 5/2012 | Li | H04R 1/403 381/302 |
| 2013/0214097 A1* | 8/2013 | Graber | B61L 23/00 246/174 |
| 2013/0259250 A1* | 10/2013 | Nicholson | G10K 11/17885 381/71.6 |
| 2014/0032099 A1* | 1/2014 | Shtukater | G01C 21/3647 701/428 |
| 2014/0142958 A1* | 5/2014 | Sharma | G10L 19/02 704/500 |
| 2014/0262601 A1* | 9/2014 | Simon | B63H 19/02 181/185 |
| 2014/0297674 A1* | 10/2014 | Rhee | B60K 37/06 707/758 |
| 2015/0110276 A1* | 4/2015 | Gereb | G01H 3/125 381/56 |
| 2015/0241871 A1* | 8/2015 | Yoshino | G05B 19/4185 702/81 |
| 2015/0255085 A1* | 9/2015 | Yamabe | G10L 21/0208 704/226 |
| 2017/0032402 A1* | 2/2017 | Patsiokas | G06Q 30/0261 |
| 2017/0099556 A1* | 4/2017 | Cierna | H04M 1/725 |
| 2017/0120803 A1* | 5/2017 | Kentley | B60W 10/18 |
| 2017/0263126 A1* | 9/2017 | Kim | G01S 5/22 |
| 2017/0297482 A1* | 10/2017 | Salter | B60Q 1/38 |
| 2018/0075759 A1* | 3/2018 | Kim | G08G 1/0965 |
| 2018/0080788 A1* | 3/2018 | Belvadi Shankaraiah | G01C 21/3484 |
| 2018/0084338 A1* | 3/2018 | Bostick | H04R 3/005 |
| 2018/0164804 A1* | 6/2018 | Hou | G05D 1/0246 |
| 2018/0261237 A1* | 9/2018 | Moore | G01S 3/8083 |
| 2018/0302738 A1* | 10/2018 | Di Censo | G06F 3/165 |
| 2018/0336000 A1* | 11/2018 | Vaughn | H04R 1/1083 |
| 2019/0035381 A1* | 1/2019 | Maziewski | G10K 11/17837 |
| 2019/0066041 A1* | 2/2019 | Hance | G01C 21/3407 |
| 2019/0213426 A1* | 7/2019 | Chen | G06V 20/588 |
| 2019/0361666 A1* | 11/2019 | Oide | H03G 3/32 |
| 2019/0376838 A1* | 12/2019 | Frey | H04M 1/72406 |
| 2019/0385583 A1* | 12/2019 | Muggleton | A61F 2/06 |
| 2020/0053497 A1* | 2/2020 | Careglio | H04L 67/12 |

* cited by examiner

DEPLOYING AN EMERGENCY VEHICLE

CROSS-REFERENCE TO RELATED APPLICATIONS

This application claims priority to U.S. Prov. App. No. 62/733,477, filed on Sep. 19, 2018, and entitled "BUILDING URBAN AREA NOISE POLLUTION MAPS AND MITIGATING NOISE FROM EMERGENCY VEHICLES", which is incorporated herein by reference.

TECHNICAL FIELD

This application is directed to the field of information technologies for measuring and mitigating urban noise.

BACKGROUND OF THE INVENTION

Urban area noise negatively affects lives of hundreds of million people worldwide and causes a number of health problems, both short and long term, such as sleep disturbance, cardiovascular effects, poorer work and school performance, hearing impairment, etc. Children and elderly people are particularly vulnerable to noise pollution. Thus, a 24-month study of children living near an airport in Germany discovered that the children had long term memory loss and reading impairment.

According to various studies, about 30 million people in the United States are exposed to hazardous sound levels at their workplace every day. Twenty-five percent of the US population suffering from hearing loss have Noise Induced Hearing Loss (NIHL). The Centers for Disease Control and Prevention (CDC) found that mining was the industry with the loudest work environment, followed by manufacturing and construction; about 1 in 8 of the workers in these and similar industries had hearing loss caused by their work environment. An estimated 80% of the US, including many parks and protected areas, is now located within 1 kilometer of a road, thanks to rapidly growing residential and industrial areas. A study recorded noise levels at 492 sites across the country with varying levels of protection. Processing and extrapolating results of this study showed that noise pollution doubled sound levels in 63% of protected areas and caused a 10-fold increase in 21%. The European Union's statistics show that about 40% of the population in EU countries is exposed to road traffic noise at levels exceeding 55 db(A), 20% is exposed to levels exceeding 65 dB(A) during the daytime, and more than 30% is exposed to levels exceeding 55 dB(A) at night, far above safe noise levels.

Noise pollution in the US is regulated, for the most part, by ordinances at various municipal levels, which limit the amount of noise, the duration of noise and the source of noise, and usually placing restrictions for certain times of the day, for example, establishing curfews on night takeoffs and landings of the aircraft for airports located near densely populated areas. Most comprehensive noise ordinances include four types of regulations combining subjective (official) and objective (measurements) judgments with emission (output by a sound source) and immission (input received by a listener). Additionally, US regulations may be different for stationary and mobile sources of noise. Overall, various regulations define several dozen stationary and mobile noise sources.

In an effort to build an objective quantitative picture of noise pollution, the U.S. Bureau of Transportation Statistics has released (in 2017) the first National Transportation Noise Map, predominantly measuring the acoustic impact of air traffic and highways. In the EU, European Directive 2002/49/EC requires member states to regularly provide and to make publicly available accurate mappings of noise levels throughout all agglomerations with more than 250,000 inhabitants.

Various mechanisms of regular quantification of noise pollution have been proposed, including sensor networks deployed in urban areas and smartphones with dedicated applications used for noise measurements. Notwithstanding progress in the noise measurement area, all existing solutions suffer from significant limitations and drawbacks. For instance, permanently deployed sensor networks don't have the capability to capture a sufficient breadth of noise sources, adapt to changing environment (such as new construction areas) and require significant periodic maintenance, while phone-based noise measurement applications have not proven to be in full compliance with noise measurement standards.

Accordingly, it is desirable to create a comprehensive, robust and adaptive system for continuous noise pollution measurements and for building accurate and current noise pollution maps.

SUMMARY OF THE INVENTION

According to the system described herein, constructing a noise pollution map for an area includes a first subset of users performing initial noise recordings in the area using audio devices, using machine learning to provide classification of noises in the initial noise recordings, a second subset of users, larger than the first subset of users, capturing noise in the area using audio devices, creating summaries of noises using the classification to classify noises captured by the second subset of users, and aggregating the summaries to construct the noise pollution map of the area. The audio devices may include headsets, smart speakers, smart television sets, and/or computers. The summaries of noises may be created using software that is installed locally on devices of the second subset of users. The summaries may include source information, amplitude and frequency characteristics, duration, parameters of a corresponding one of the audio devices, user location, surroundings, and/or user movement information. The software that is installed locally on devices of the second subset of users may create the summaries by breaking down raw mixed noise recordings into fragments emitted by different sources based on the classification of noises captured by the first subset of users. The initial noise recordings may be uploaded to a cloud database. Data in the cloud database may be used for machine learning to classify the noises in the noise recordings. A cloud component may receive the noise summaries from the second subset of users. The cloud component may analyze and aggregate the noise summaries to construct the pollution map. Each noise pollution source may be represented by a different multi-dimensional surface in the noise pollution map. Aggregating the noise summaries may include indicating excessively and dangerously noise polluted areas. Aggregating the noise summaries may include indicating daytime periods, use areas, and violations of ordinances. Active noise cancellation features of the audio devices may be used to collect noise signals that are otherwise filtered out for audio quality improvement purposes. The initial noise recordings may be classified based on frequency spectrum, volume, time/frequency of occurrence, and sources of the initial noise recordings. The sources of the initial noise recordings may be determined based on annotations provided by the first set of users. The sources of the initial noise recordings may be determined also based on frequency spectrum, volume, and/or time/frequency of occurrence. The first set of users and the second set of users may filter out at least some of the noise recordings.

According further to the system described herein, deploying an emergency vehicle includes using a siren that provides sound predominantly in a specific direction that varies according to input provided by a user and causing the siren to deliver sound to an obstructing vehicle that is obstructing an optimal path for travel by the emergency vehicle. The optimal path may traverse a lane adjacent to a lane occupied by the emergency vehicle. The obstructing vehicle may be in front of the emergency vehicle. An automatic navigation system may detect the optimal path. The automatic navigation system may be cloud-based. The automatic navigation system may use information from components on the emergency vehicle that include gyroscopes, turn indicators, steering wheel position, and/or radar. The automatic navigation system may cause the siren to deliver sound to the obstructing vehicle by sending a signal to a driver of the emergency vehicle and/or the siren.

According further to the system described herein, a non-transitory computer readable medium contains software that constructs a noise pollution map for an area. The software includes executable code that performs initial noise recordings in the area using audio devices of a first subset of users, executable code that uses machine learning to provide classification of noises in the initial noise recordings, executable code that captures noise in the area using audio devices for a second subset of users that is larger than the first subset of users, executable code that creates summaries of noises using the classification to classify noises captured by the second subset of users, and executable code that aggregates the summaries to construct the noise pollution map of the area. The audio devices may include headsets, smart speakers, smart television sets, and/or computers. The summaries of noises may be created using software that is installed locally on devices of the second subset of users. The summaries may include source information, amplitude and frequency characteristics, duration, parameters of a corresponding one of the audio devices, user location, surroundings, and/or user movement information. The software that is installed locally on devices of the second subset of users may create the summaries by breaking down raw mixed noise recordings into fragments emitted by different sources based on the classification of noises captured by the first subset of users. The initial noise recordings may be uploaded to a cloud database. Data in the cloud database may be used for machine learning to classify the noises in the noise recordings. A cloud component may receive the noise summaries from the second subset of users. The cloud component may analyze and aggregate the noise summaries to construct the pollution map. Each noise pollution source may be represented by a different multi-dimensional surface in the noise pollution map. Aggregating the noise summaries may include indicating excessively and dangerously noise polluted areas. Aggregating the noise summaries may include indicating daytime periods, use areas, and violations of ordinances. Active noise cancellation features of the audio devices may be used to collect noise signals that are otherwise filtered out for audio quality improvement purposes. The initial noise recordings may be classified based on frequency spectrum, volume, time/frequency of occurrence, and sources of the initial noise recordings. The sources of the initial noise recordings may be determined based on annotations provided by the first set of users. The sources of the initial noise recordings may be determined also based on frequency spectrum, volume, and/or time/frequency of occurrence. The first set of users and the second set of users may filter out at least some of the noise recordings.

The proposed system employs various mobile and stationary devices with active noise cancelation technologies for a three-phase process of continuous measurement and mapping of urban noise pollution. At the first phase, a designated group of owners of qualifying devices provides samples of recorded noise segments to a cloud database. At the second phase, the samples are used as training data by a machine learning component, which builds noise classifier by sources. At the third phase, local software for noise classification, creation of noise summaries, and transmission of summaries to the cloud component is deployed on large numbers of qualifying devices for permanent tracking of noise pollution and for building up-to-date detailed noise pollution maps by a cloud-based component based on the stream of noise summaries. Additionally, a directed sound emitter is proposed as a signaling device for emergency vehicles to lower urban noise levels and allow more efficient navigation of emergency devices in city traffic.

Qualifying devices for each phase of the system setup and deployment may include, without limitation:

Mobile headsets with active noise cancelation features (technology), whether over-the-ear or in-the-ear models. Such headsets may normally be supplied with additional microphone(s) for continuous capturing and building of a noise signal (profile), subsequently suppressed and/or filtered out to improve the quality of desired audio streams (speech, music, etc.).

Smart speakers, such as Amazon Alexa, Google Home, Apple HomePod, etc.

TV sets and computers with voice assistants and/or voice control.

With each category of the qualifying devices, detected noise signals may be continuously recorded and transmitted prior to filtering the signals out. A captured noise signal may represent a real-time noise pollution profile in the vicinity of a device owner. Such treatment of noise, identified and recorded by qualifying devices, opens the possibility for broad crowdsourcing of permanent and adequate noise pollution measurements; the potential of noise capturing could quickly grow with the proliferation of hearables and other mobile and stationary audio devices.

The efficiency of the proposed system may be enhanced by a dedicated architecture, features and workflow, explained in more details below.

1. At a first phase of building the proposed system, a significant but limited number of qualifying devices may be deployed to a group of owners who are signed up to a special program aimed at providing raw samples of recorded noise segments. Such recordings, during the first phase of system construction, may be created using a special application (Phase 1 Application) installed on mobile headsets or, alternatively, on smartphones, tablets or other devices that operate the headsets. The Phase 1 Application may:

I. copy noise signals that are otherwise filtered out for audio quality improvement purpose. The noise signals may be identified by a noise cancelation system of a headset, smart speaker, etc. using, for example, a system on a chip;

II. control the duration of each recording;

III. store the recorded noise signal locally, allowing program participants (i.e., device owners) to add annotations to recorded clips, such as labeling major noise sources within each recording; and IV. transmit complete locally stored samples to a cloud database.
2. Once a sufficient volume of recorded noise samples has been collected through the program running at the first phase of the system, the stored cloud collection of noise samples may be used, at a second phase, as a training set. The purpose and output of the machine learning may be a classifier capable of identifying major noise sources within a noise recording sample and separating such sources within a sample. Major noise sources may be classified based on one or more of frequency spectrum, volume, time/frequency of occurrence, annotations provided by owners of qualifying devices in the first phase, etc.
3. The classifier built at the previous step may be integrated as a component of local software, installed, at the third phase, on a broad array of mobile and stationary qualifying devices (potentially, many millions of units), spread across multiple urban locations and performing continuous noise pollution tracking (Phase 3 Application). The Phase 3 Application installed on the headsets (or other mobile or stationary devices that are operating the headsets or other audio devices, as explained above) may perform the following functions:
   a. Capturing noise signal identified by the noise cancelation technology working in a mobile headset (similarly to the first phase).
   b. Classifying and breaking down noise signal into fragments emitted by different sources.
   c. Building noise summaries for the identified source specific noise fragments, including source; amplitude and frequency characteristics; duration of the fragment; parameters of the headset; user location; surroundings; movement, etc. Other devices and sensors may supplement the audio portion with additional measurements.
   d. Uploading noise summaries for each source to the cloud component of the system.
4. Noise summaries produced by the local software may have significant advantages over full raw recordings of noise samples at the mass deployment phase, as follows:
   (i) using noise summaries may decrease required upload bandwidths by orders of magnitude;
   (ii) using noise summaries may substantially alleviate privacy concerns by users;
   (iii) using noise summaries may prevent occasional leakage of user conversations or other private audio sources and therefore broaden the privacy sensitive crowdsourcing base for ubiquitous and continuous noise pollution measurements; and
   (iv) users may be able to filter out certain noise sources if the users consider the sources private or irrelevant; examples may include baby crying, canine barking, loud TV sound, sound of working AC, etc.
5. The cloud component may receive noise summaries created and uploaded at the third phase, analyze and aggregate the noise summaries and constantly update noise pollution maps for all areas where qualifying devices for noise pollution tracking are deployed in sufficient numbers. The system may also produce analytics, such as excessively and dangerously noise polluted areas, noise pollution dynamics by daytime periods (Day, Evening, Night), by use areas (residential, commercial, industrial), detectable violations of ordinances, etc. Based on the above, the system may communicate with urban planning authorities, law enforcement officials, etc.

The proposed system also includes noise mitigation for emergency vehicles that may replace existing sirens with directional sound sources. Such sources differ from traditional sirens by emitting signals that sound similar to existing devices but are limited in spatial reach. A conic sound emission zone (sound beam) of the emergency vehicles may be directed at vehicles moving ahead and preventing unobstructed and speedy navigation required for efficient operation of an emergency vehicle. The direction, sound intensity and tone of the sound beam may be controlled by a vehicle operator and may have an assistant module integrated with satellite based and other traffic maps; accordingly, the directional signaling may occur in continuously updated optimal directions along an optimal navigation path, which may be calculated based on the nearby traffic conditions.

The directional adaptive sirens may be directly integrated with a GPS system, as well as with other vehicle components that can be used to predict movement and track vehicle path, such as gyroscopes, turn indicators, steering wheel, and radar. Additionally, the directional siren may be integrated with directional lights for combined audio/visual signaling, allowing further noise reduction.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for capturing noise samples by groups of users with certain types of audio replaying and recording devices, storing and classifying recorded noise samples by sources using machine learning, ubiquitous mass capturing of noise samples by devices supplied with classifiers and capable of building noise summaries, transferring noise summaries to a cloud system for building area noise pollution maps, and for mitigating noise from emergency vehicles utilizing directional sirens.

Figure 1:
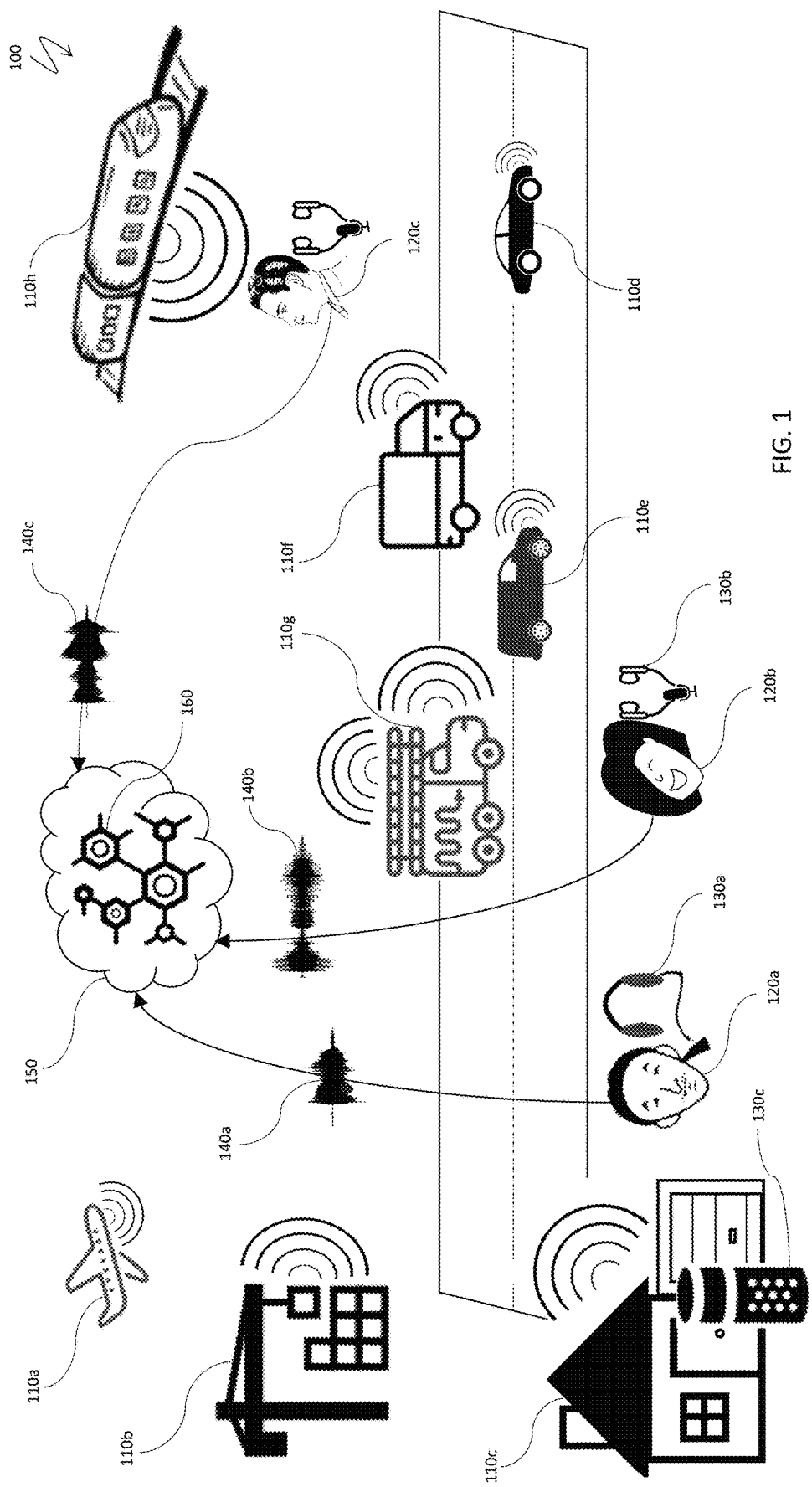
FIG. 1 is a schematic illustration of collecting noise samples and system training, according to an embodiment of the system described herein.

FIG. 1 is a schematic illustration 100 of collecting noise samples and system training. The illustration 100 shows multiple noise sources associated with an aircraft 110a, construction site 110b, domestic noise 110c, cars 110d, SUVs 110e, trucks 110f, emergency vehicles 110g, and trains 110h. Other noise sources are also possible. Qualified users 120a, 120b, 120c, participating in the first phase of system setup, as explained elsewhere herein, are recording noise samples using devices 130*a*, 130*b* with active noise cancelation. The user 120*c* is using a device that is similar to the device being used by the user 120*b*. Recorded noise samples 140*a*, 140*b*, 140*c* are uploaded to a cloud component 150 of the system, stored in a database and eventually used to form a training set for a cloud-based machine learning component 160. As discussed elsewhere herein, the machine learning may classify major noise sources based on one or more of: frequency spectrum, volume, time/frequency of occurrence, annotations provided by owners of qualifying devices in the first phase, etc.

Figure 2:
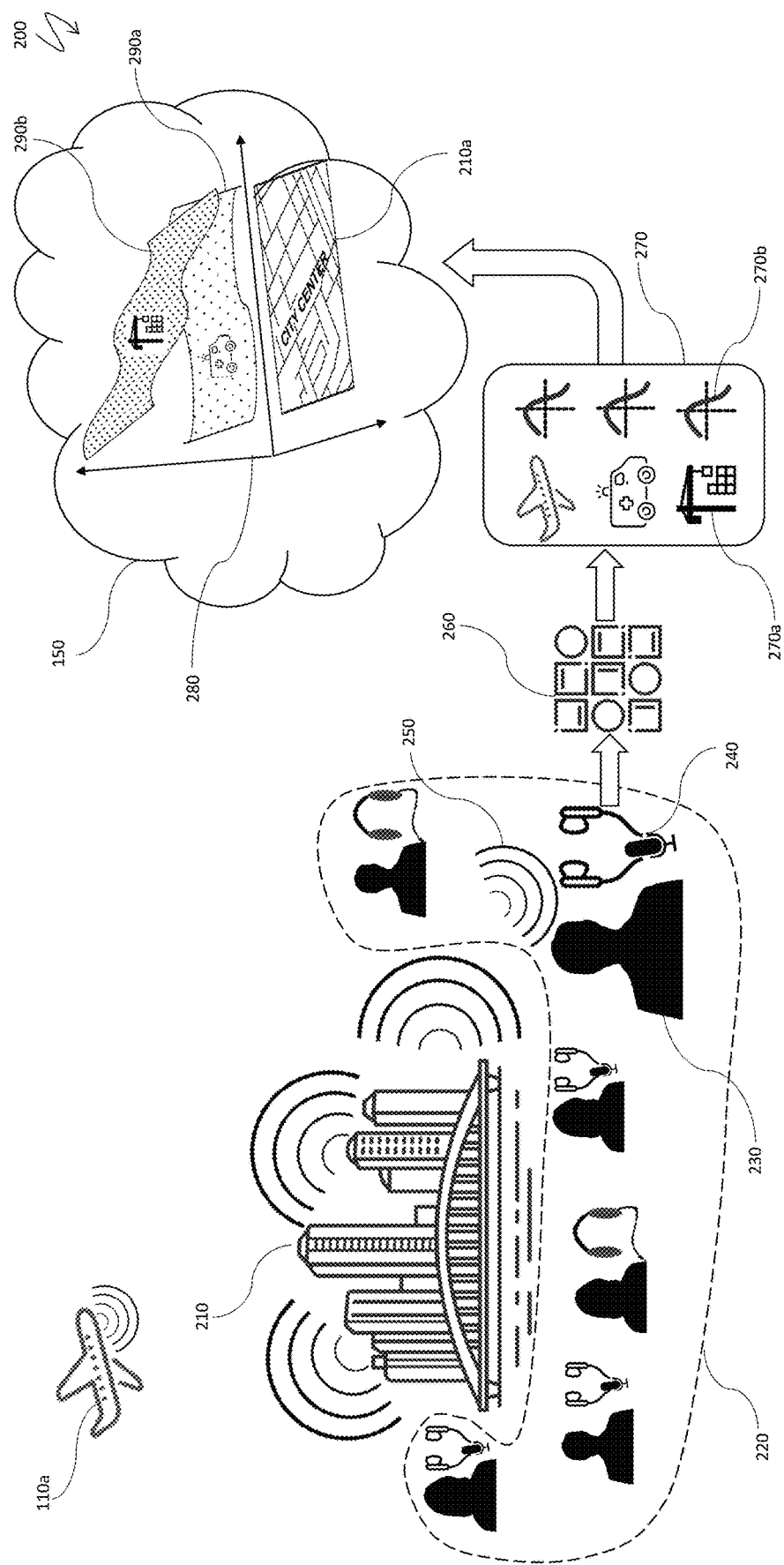
FIG. 2 is a schematic illustration of building an up-to-date noise pollution map, according to an embodiment of the system described herein.

FIG. 2 is a schematic illustration 200 of building an up-to-date noise pollution map. An urban area, such as a city center 210, represented in the system by a map 210*a*, may be exposed to multiple noise sources (see FIG. 1 for more details), one of which, an aircraft 110*a*, is shown in FIG. 2. A significant group 220 of participants of the third phase of the project capture noises in various parts of the city center 210 using qualifying audio and other mobile devices with pre-installed software for recording and classifying noise and for creating noise summaries, as explained elsewhere herein. Specifically, a participant 230 from the group 220 is shown using an in-the-ear headset with active noise cancelation 240 to record incoming noises 250 and to process noise samples using the local software installed on the headset, as explained elsewhere herein. A recorded sample may be first classified by noise sources using a classifier 260 (built by training the machine learning component 160 in FIG. 1). Subsequently, a noise summary 270 may be created by the local software, where each identified noise source 270*a* is supplied with noise analytics and parameters 270*b* specific for the noise source.

Noise summaries are uploaded to the cloud component 150, processed for each participating and active user and aggregated into a multi-dimensional area noise pollution map 280, where each noise pollution source may be represented by a different multi-dimensional surface, illustrated in FIG. 2 that shows a vehicle noise related surface 290*a* and a construction noise related surface 290*b*. In a particular case where the vertical coordinate in the map 280 represents only noise intensity, surfaces of the area noise pollution map may be three-dimensional.

Figure 3A:
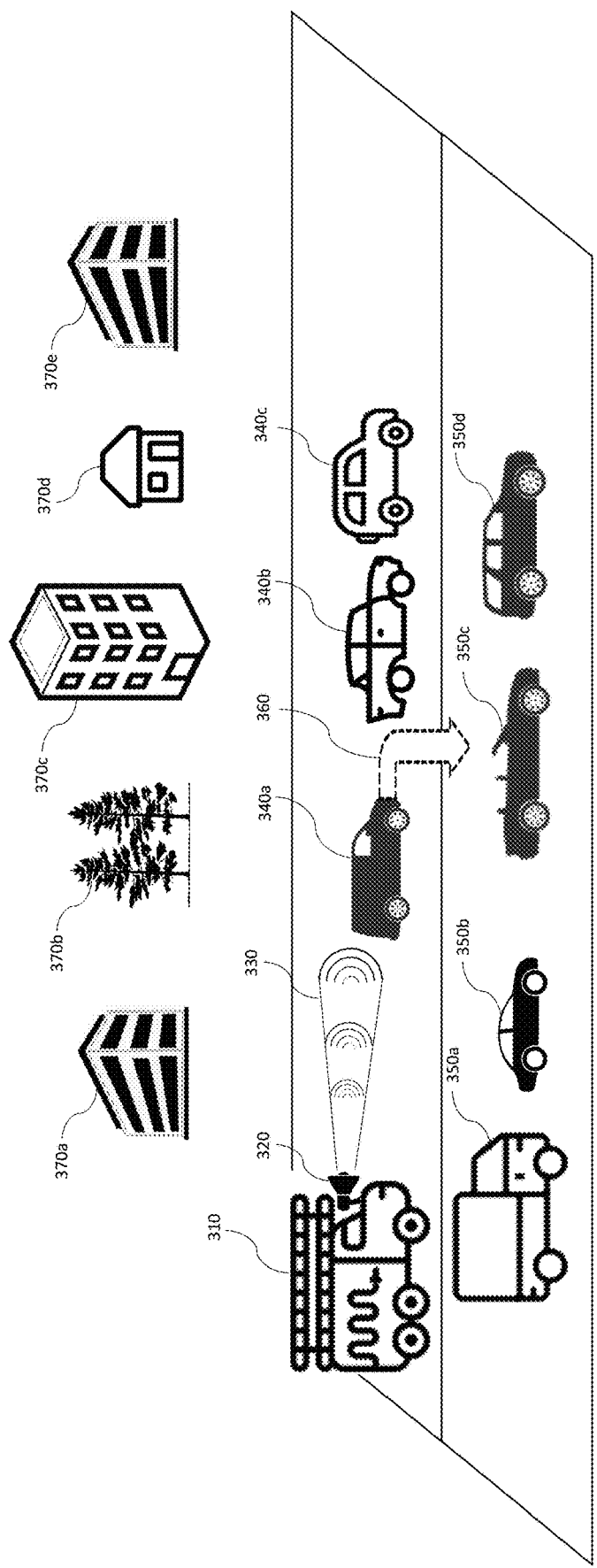
FIG. 3A-3B are schematic illustrations of an emergency vehicle using a directional sound signal, according to an embodiment of the system described herein.
Figure 3B:
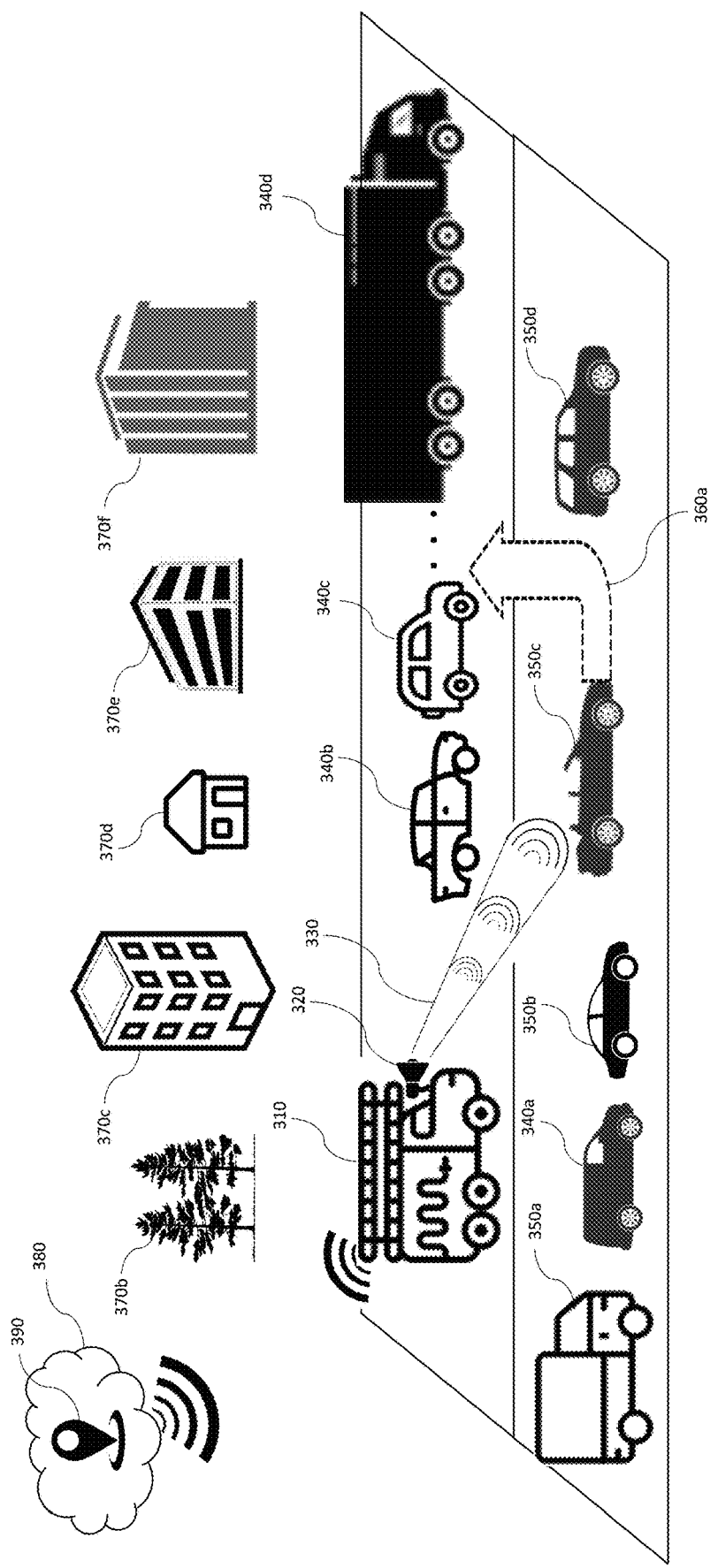

FIGS. 3A-3B illustrate functioning of an emergency vehicle 310 with a directional sound siren. The emergency vehicle 310 is supplied with a directional sound siren 320 having a conic sound emission zone (sound beam) 330. A two-lane traffic roadway illustrated in FIG. 3A shows three vehicles 340*a*, 340*b*, 340*c* ahead of the emergency vehicle 310 in the same lane as the emergency vehicle 310 and four more vehicles 350*a*, 350*b*, 350*c*, 350*d* in an adjacent lane.

Traditional sirens have extensive spatial reach having a signal that is spread upon vehicles that in no way obstruct the path of the emergency vehicle and disrupt work and private life in adjacent buildings 370*a*, 370*c*, 370*d*, 370*e*, as well as people that may enjoy their rest in a park 370*b*. However, in the case of the emergency vehicle 310, the directional sound siren 320 does not appreciably disrupt every nearby vehicles or occupants of nearby buildings, recreational objects, etc. In FIG. 3A, the emergency vehicle 310 performs a straightforward task of requesting the right of way in the same lane. The siren of the emergency vehicle 310 is directed at the vehicle 340*a* moving ahead of the emergency vehicle 310 and potentially preventing its unobstructed and speedy navigation. This signal causes the vehicle 340*a* to maneuver and free a space in the adjacent lane for the emergency vehicle 310, for example, by changing lanes, as shown by an arrow 360. This occurs without distracting any other drivers or people in the vicinity of the road.

FIG. 3B shows a more sophisticated networked use of the directional siren 320. The directional siren 320 starts a few seconds later, when the vehicle 340*a* has already changed lanes and the emergency vehicle 310 has moved ahead. At this time, a cloud-based automatic navigation system 380 with GPS functionality 390 has detected that a massive trailer 340*d* is moving at some distance ahead of the emergency vehicle 310 in the same lane and it would be inefficient to continue pursuing the right of way in the lane currently occupied by the emergency vehicle 310 compared with changing lanes. Accordingly, the automatic navigation system 380 recommends to the driver of the emergency vehicle 310 to change tactics (or the automatic navigation system 380 may automatically or semi-automatically control the directional siren). In response, the directional siren 320 requests the right of way from the car 350*c*, which is right ahead of the emergency vehicle 310 in the s adjacent lane. The directional siren 320 causes the car 350*c* to perform a maneuver 360*a*, freeing the way for the emergency vehicle 310.

The direction, sound intensity and tone of the sound beam 330 may be controlled by the vehicle operator and may have an assistant module integrated with satellite based and other traffic maps and directly integrated with a GPS system, as well as with other tracking equipment, such as gyroscopes, turn indicators, steering wheel, and radar. Additionally, the directional siren can be integrated with directional lights for combined audio/visual signaling, allowing further noise reduction.

Figure 4:
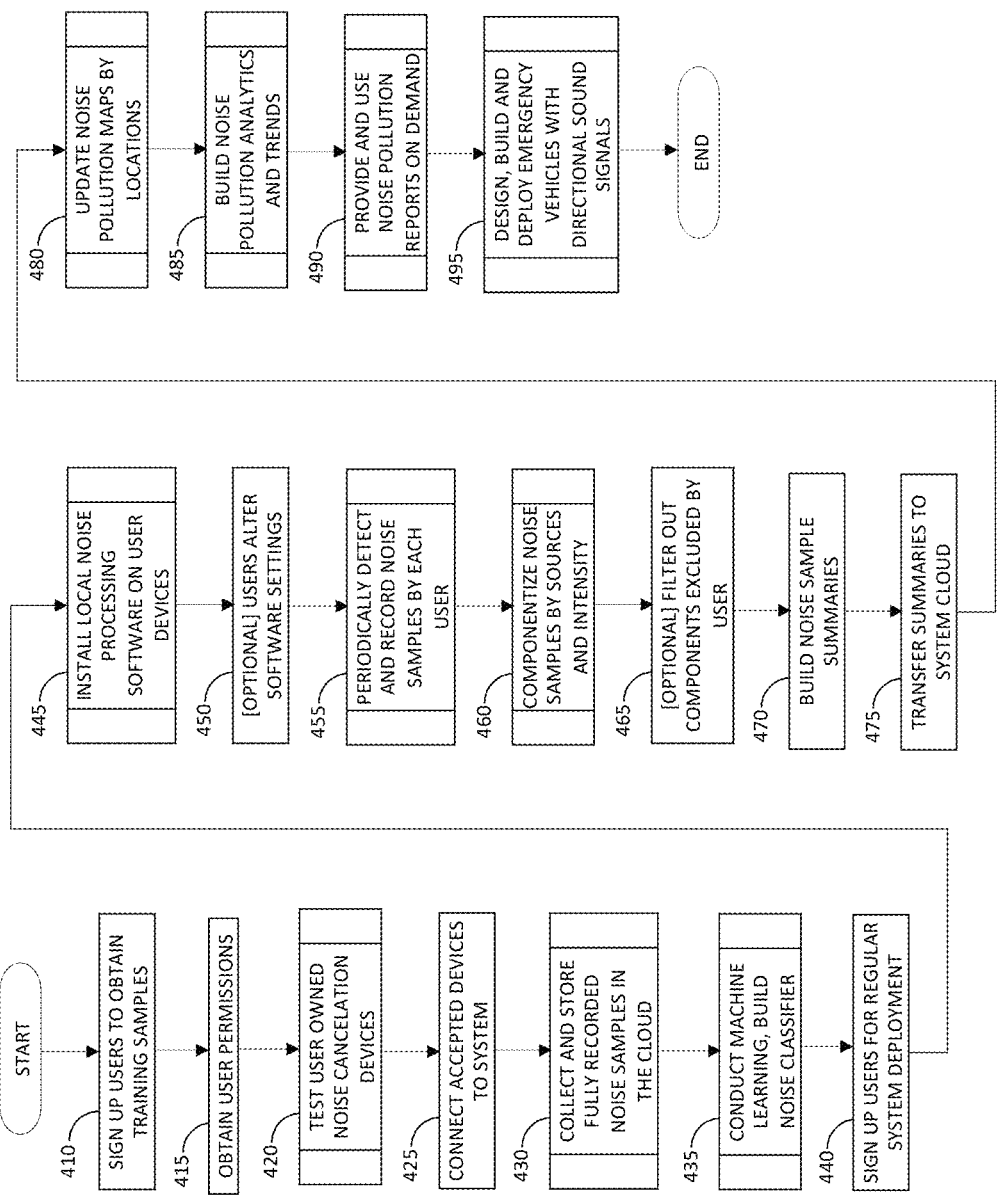
FIG. 4 is a system flow diagram illustrating system functioning in connection with capturing urban noise, creating noise pollution maps and mitigating noise from emergency vehicles, according to an embodiment of the system described herein.

Referring to FIG. 4, a system flow diagram 400 illustrates system functioning in connection with capturing urban noise, creating noise pollution maps and mitigating noise from emergency vehicles. Processing begins at a step 410, where users corresponding to the first phase (described above) are signed up to collect training samples of noise recordings. After the step 410, processing proceeds to a step 415 where the system obtains user permissions to use the qualifying devices of the users for capturing noise samples. After the step 415, processing proceeds to a step 420 where the system tests user owned noise cancellation devices (headsets, smart speakers, etc.). After the step 420, processing proceeds to a step 425 where accepted devices are connected to the system. After the step 425, processing proceeds to a step 430 where fully recorded noise samples are collected and stored in the cloud (see FIG. 1 and the accompanying text for details).

After the step 430, processing proceeds to a step 435 where the system conducts machine learning based on the collected samples as a training set and builds noise classifier, as explained elsewhere herein (phase two of the system construction). After the step 435, processing proceeds to a step 440 where users are signed up for participation in a regular system deployment (the third phase of system functioning). After the step 440, processing proceeds to a step 445, where the local noise processing software is installed on user devices, as explained elsewhere herein. After the step 445, processing proceeds to a step 450, where users may optionally alter local software settings. After the step 450, processing proceeds to a step 455 where users periodically detect and record noise samples. After the step 455, processing proceeds to a step 460 where the local software componentizes recorded noise samples by sources, intensity and other parameters, as explained elsewhere herein. After the step 460, processing proceeds to a step 465, where certain components may optionally be excluded by a user due to privacy, irrelevance or other reasons and are filtered out.

After the step 465, processing proceeds to a step 470, where the local software builds noise summaries for collected noise samples. After the step 470, processing proceeds to a step 475, where noise summaries are uploaded to the system cloud component. After the step 475, processing proceeds to a step 480, where the system updates cloud-based noise pollution maps by locations. After the step 480, processing proceeds to a step 485, where the system builds noise pollution analytics and trends. After the step 485, processing proceeds to a step 490, where the system provides noise pollution reports on demand. After the step 490, processing proceeds to a step 495 (independent from the rest of the system flow diagram), where emergency vehicles with directional sirens are designed, deployed and built. After the step 495, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to headsets with active noise cancelation, smart speakers, other systems with voice control, smartphones, tablets, smart TV sets and other mobile computers. Mobile devices may use operating system(s) selected from the group consisting of: iOS, Android OS, Windows Phone OS, Blackberry OS and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of deploying an emergency vehicle, comprising:
    using a directional siren that provides sound predominantly in a specific direction that varies according to input provided by a user;
    determining an optimal path for travel by the emergency vehicle based on nearby traffic conditions;
    determining that the optimal path for travel by the emergency vehicle includes changing to an adjacent lane; and
    using an automatic navigation system to cause the directional siren to deliver sound to an obstructing vehicle in the adjacent lane that is obstructing the optimal path for travel by the emergency vehicle, wherein the sound is provided in a conic emission zone that avoids spreading the sound to vehicles that are not in the optimal path for travel.

2. The method, according to claim 1, wherein the automatic navigation system detects the optimal path.

3. The method, according to claim 1, wherein the automatic navigation system is cloud-based.

4. The method, according to claim 1, wherein the automatic navigation system uses information from components on the emergency vehicle that include at least one of: gyroscopes, turn indicators, steering wheel position, and radar.

5. The method, according to claim 2, wherein the automatic navigation system sends a signal to at least one of: a driver of the emergency vehicle and the siren.

6. The method, according to claim 1, wherein the directional siren is integrated with directional lights for combined audio/visual signaling.

7. A method of deploying an emergency vehicle, comprising:
    determining an optimal path for travel by the emergency vehicle based on nearby traffic conditions, wherein the optimal path includes lanes that are adjacent to a lane containing the emergency vehicle and includes the lane containing the emergency vehicle;
    using a directional siren that provides sound predominantly in a specific direction that varies according to input provided by a user, wherein the sound is provided in a conic emission zone that avoids spreading the sound to vehicles that are not in the optimal path for travel;
    in response to the optimal path being a lane adjacent to the lane containing the emergency vehicle, using an automatic navigation system to cause the directional siren to deliver sound to an obstructing vehicle in the adjacent lane that is obstructing the optimal path for travel by the emergency vehicle; and
    in response to the optimal path being in the lane containing the emergency vehicle, using the automatic navigation system to cause the directional siren to deliver sound to an obstructing vehicle in the lane containing the emergency vehicle that is obstructing the optimal path for travel by the emergency vehicle.

8. The method, according to claim 7, wherein the automatic navigation system detects the optimal path.

9. The method, according to claim 7, wherein the automatic navigation system is cloud-based.

10. The method, according to claim 7, wherein the automatic navigation system uses information from components on the emergency vehicle that include at least one of: gyroscopes, turn indicators, steering wheel position, and radar.

11. The method, according to claim 8, wherein the automatic navigation system sends a signal to at least one of: a driver of the emergency vehicle and the siren.

12. The method, according to claim 7, wherein the directional siren is integrated with directional lights for combined audio/visual signaling.

13. The method, according to claim 7, wherein the directional siren is directed to a vehicle that is in a lane that is adjacent to a lane occupied by the emergency vehicle.

* * * * *